United States Patent [19]

Hill

[11] Patent Number: 4,986,062

[45] Date of Patent: Jan. 22, 1991

[54] BAGGER ATTACHMENT FOR GRASS MOWERS

[75] Inventor: Amos G. Hill, Orangeburg, S.C.

[73] Assignee: White Consolidated Industries, Inc., Cleveland, Ohio

[21] Appl. No.: 467,140

[22] Filed: Jan. 18, 1990

[51] Int. Cl.$^5$ ............................................. A01D 35/22
[52] U.S. Cl. ........................................ 56/16.9; 56/202; 56/320.2
[58] Field of Search .................... 56/16.6, 16.9, 14.5, 56/202, 203, 320.1, 320.2, 184.5

[56] References Cited

U.S. PATENT DOCUMENTS

| | | | |
|---|---|---|---|
| 3,222,853 | 12/1965 | Michael | 56/202 |
| 3,242,658 | 3/1966 | Morales | 56/202 X |
| 3,736,736 | 6/1973 | Myers | 56/16.6 X |
| 3,791,118 | 2/1974 | Behrens | 56/202 |
| 4,069,649 | 1/1978 | Mullet et al. | 56/202 |
| 4,103,477 | 8/1978 | Mullet et al. | 56/16.6 X |
| 4,262,475 | 4/1981 | Takahashi et al. | 56/16.6 |
| 4,379,385 | 4/1983 | Reinhall | 56/16.6 |
| 4,693,063 | 9/1987 | Hoepfner et al. | 56/16.6 |
| 4,899,525 | 2/1990 | Takei et al. | 56/16.6 X |
| 4,922,696 | 5/1990 | Burns et al. | 56/202 |

Primary Examiner—Thuy M. Bui
Attorney, Agent, or Firm—Pearne, Gordon, McCoy & Granger

[57] ABSTRACT

A bagger attachment for grass mowers provides a powered auger having an inlet adjacent to the mower deck discharge opening and an outlet adjacent to the upper ends of bags mounted on hoop-like supports. The auger is shaped to produce a dense column of clippings and the like which densely fill first the bag adjacent to the auger discharge and subsequently the bag remote from the auger discharge. Air entrained with the clippings is exhausted before the columns are discharged, the upper ends of the bags are open and accessible to the mower operator so that he can observe the filling thereof and also insert stones and the like. The mower deck is provided with a raised wall portion and a baffle arranged to create optimum flow of the clippings into the auger. The upper side of the auger tube is provided with a hinged cover permitting access to the auger. Such cover is shaped to resist rotation of the clippings and improve auger efficiency.

20 Claims, 4 Drawing Sheets

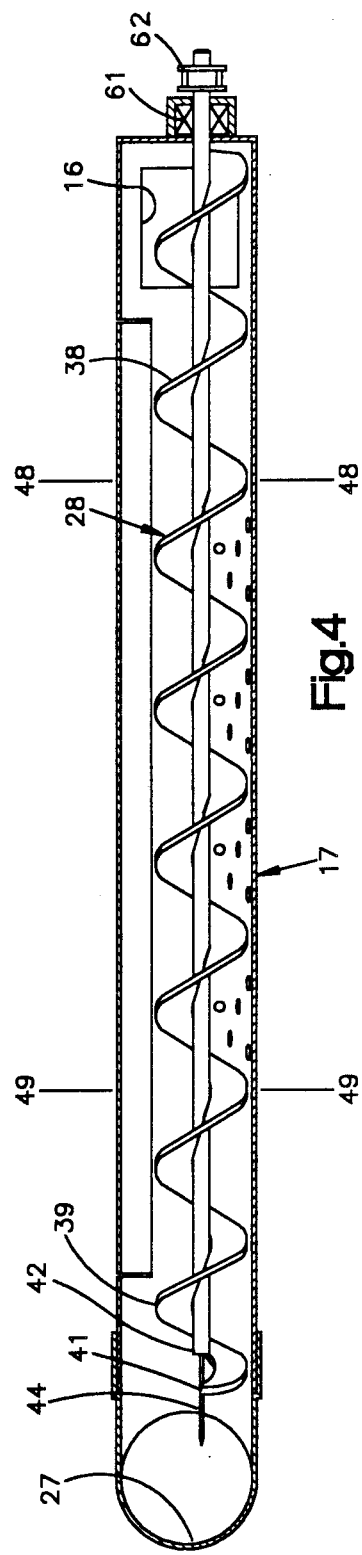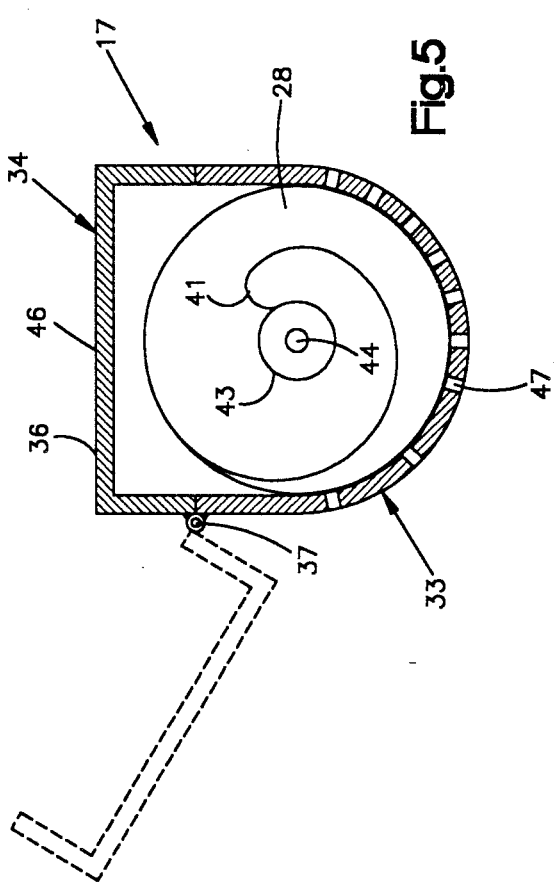

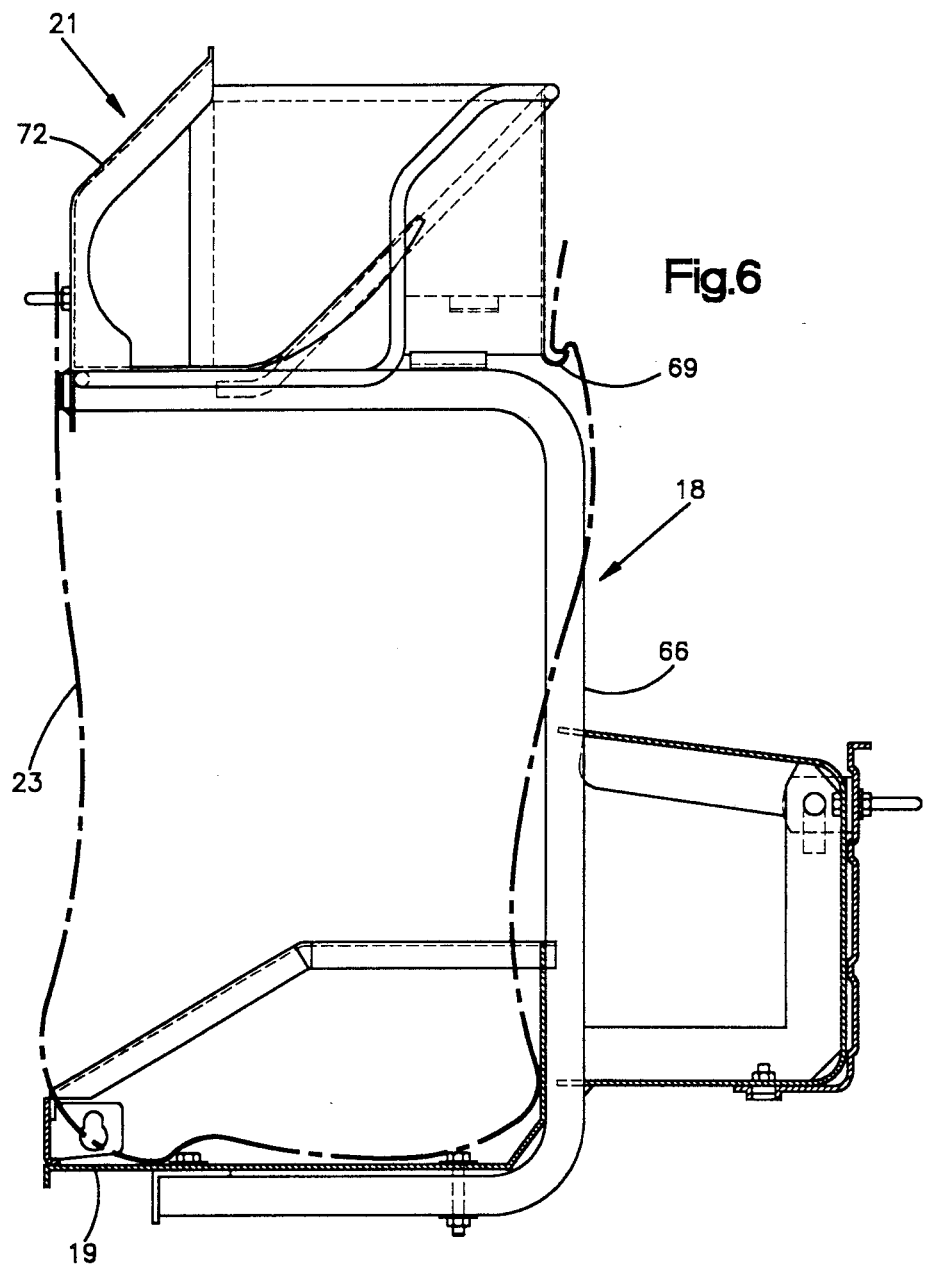

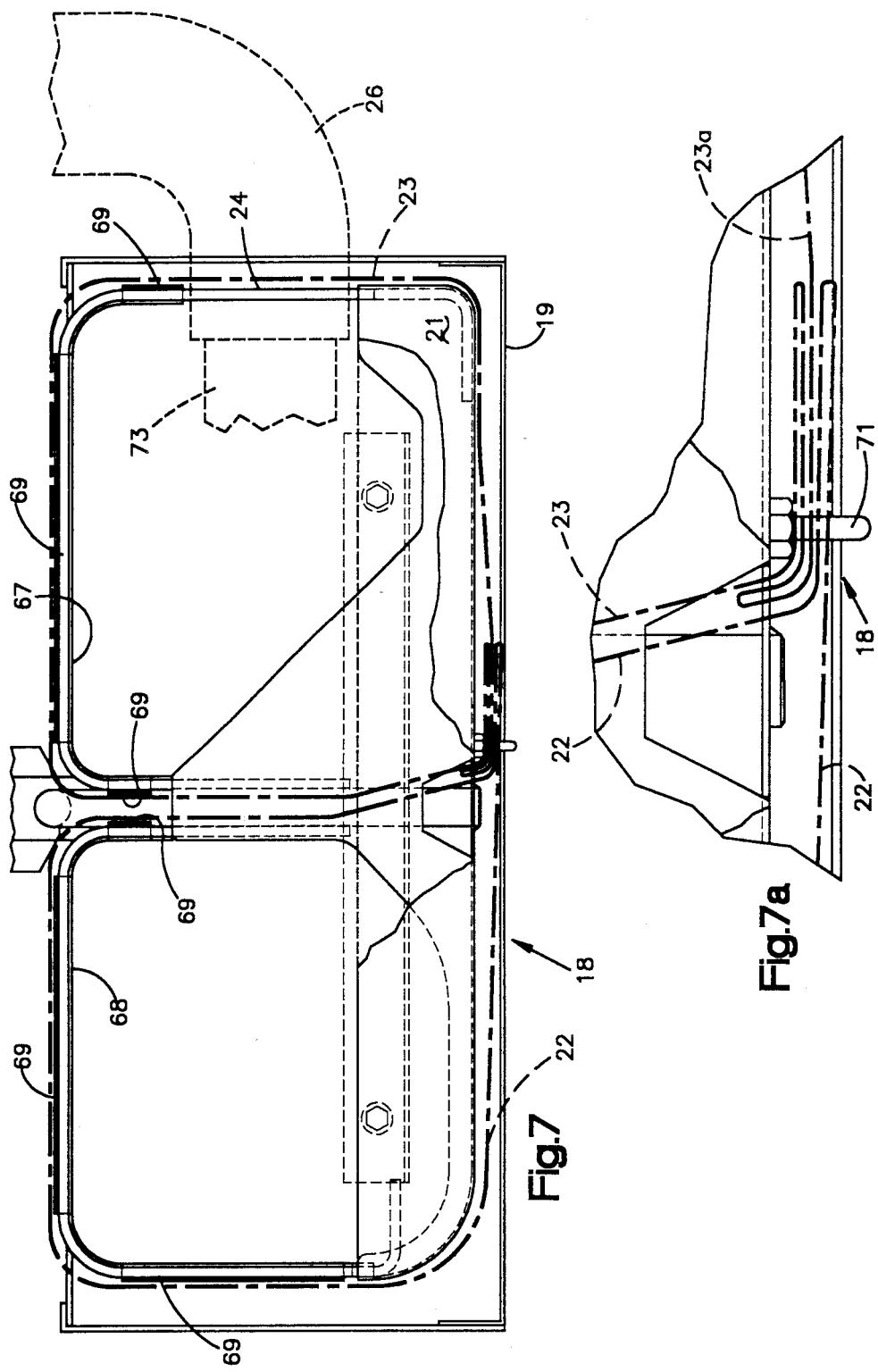

BAGGER ATTACHMENT FOR GRASS MOWERS

BACKGROUND OF THE INVENTION

This invention relates generally to mowing equipment, and more particularly to a novel and improved lawn mower accessory for collecting, compacting, and bagging grass clippings and the like.

Prior Art

U.S. Pat. Nos. 3,222,853; 3,242,658; 3,736,736; 3,791,118; 4,069,649; 4,103,477; 4,262,475; and 4,379,385 all disclose devices for use with lawn mowers and the like for collecting and/or packing grass clippings and leaves. Some of these patents describe devices provided with an auger for moving the clippings from the discharge of a rotary mower to a bag or other receptacle in which the clippings are collected. U.S. Pat. Nos. 3,222,853; 3,736,736; 3,791,118; and 4,379,385 all describe examples of such devices. Further, some of these devices provide perforations along the length of the auger tube to allow the exhaust of air which enters the auger tube from the mower.

SUMMARY OF THE INVENTION

The present invention provides a novel and improved accessory for use with lawn tractors or the like. The device receives grass clippings, leaves, and the like from a rotary mower and compacts such clippings into a dense column, which is then automatically fed into container means as a dense mass. In the illustrated preferred embodiment, the device includes two bags which may be disposable plastic bags or reusable cloth or canvas bags. Because the clippings are highly compacted, more clippings can be collected in a given size bag.

There are a number of important aspects to this invention. In accordance with one aspect, an auger is enclosed within an auger tube or housing having a semicircular lower wall which closely fits the lower side of the auger and an upper wall portion spaced from the auger and formed with planar portions intersecting at corners extending lengthwise of the tube. In the illustrated embodiment, the upper wall portion is generally rectangular in cross section and is hinged so that it can be opened to provide access to the auger. The upper wall portion resists rotation of the clippings with the auger and improves the efficiency of the auger in moving the clippings along the length of the auger tube. Further, the spacing between the auger and the upper wall portion of the tube accommodates stones and sticks which might otherwise jam within the auger tube.

The lower wall portion of the auger tube is provided with a plurality of apertures to permit the exhaust of the air which the cutter blades introduces into the auger tube. These apertures are arranged in an array spaced from the entrance end of the auger tube so that stones and the like which could produce a hazard cannot be thrown by the cutter blade through the aperture. Further, the array of apertures is spaced from the discharge end of the tube to minimize resistance to flow of the clippings. Still further, the array of apertures is arranged so that the majority of the apertures in the lower semicircular wall portion are along the side thereof toward the mower. This tends to cause the dust and dirt expelled through the apertures to pass under the tractor, where it is less objectionable.

In accordance with another important aspect of this invention, the auger itself is provided with a helical flight in which the pitch or helix angle is reduced at the exit end of the auger. Further, the radial height of the flight is also reduced at the exit end. This structure further compresses the mowed material, etc., and ensures that they will exit the auger tube as a very compact column. Further, a spike extends beyond the ends of the flight at the exit end of the auger, and therefore extends a short distance into the column. Such spike serves to stabilize the exit end of the auger.

In accordance with another aspect of this invention, a novel and improved support system is provided for the bags which are filled. The support system is removably mounted on the rear of a lawn tractor and provides two hoop-shaped retainers. A plastic or cloth bag is mounted on each retainer and is held open so that the column of clippings can enter the bags. When the bag adjacent the auger tube discharge is filled, the column of clippings automatically passes over the adjacent bag and fills the other bag. As the mower is driven over the ground, the partially filled bags are subjected to a shaking action which further compacts the clippings the like. Therefore, a very compact filling is achieved and large quantities of clippings and the like are deposited in each bag. Further, the upper sides of the hoop retainers are open, permitting the operator to observe the filling operation and to conveniently place sticks, stones, and the like in a bag as the mowing continues.

These and other aspects of this invention are illustrated in the accompanying drawings, and are more fully described in the following specification.

BRIEF DESCRIPTION OF THE DRAWINGS

FIG. 4 is a longitudinal section of the auger tube and auger structure;

FIG. 5 is a schematic cross section through the auger tube illustrating the manner in which the auger fits the auger tube and illustrating the hinged cover for providing access to the auger;

FIG. 6 is a side elevation of the bag support structure which is removably mounted on the lawn tractor and operates to support the plastic or cloth bags while they are being filled;

FIG. 7 is a plan view of the support structure illustrated in FIG. 6; and

FIG. 7a is an enlarged, fragmentary view illustrating the manner in which the bags are attached to the bag support for filling.

DETAILED DESCRIPTION OF THE DRAWINGS

Figure 1:
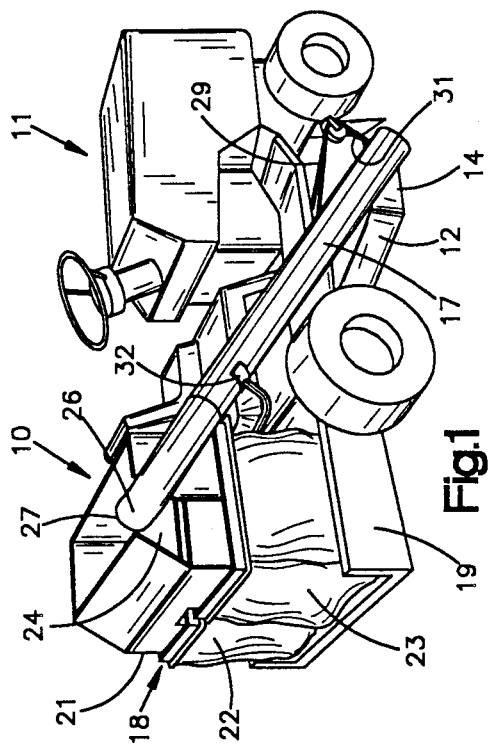
FIG. 1 is a perspective view of a bagging attachment incorporating this invention mounted on a typical lawn tractor.
Figure 2A:
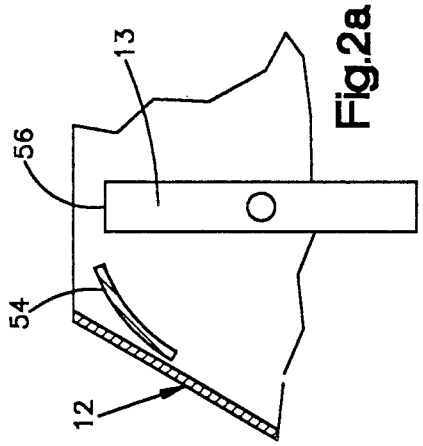
FIG. 2a is a fragmentary plan view, partially in section, illustrating a deflector wall which improves the flow of grass clippings and the like into the auger tube.

FIG. 1 illustrates a preferred embodiment of a bagging attachment 10 incorporating the present invention installed on a typical lawn tractor 11. The tractor 11 provides a rotary-type mower deck 12. Typically, such mower deck provides two or three rotary cutter blades 13 which rotate about vertical axes and operate to eject grass clippings, leaves and other debris out through a discharge opening 14 into an aligned inlet opening 16 at one end of the auger tube 17.

Mounted on the rear of the tractor 11 is a bag support assembly 18 which includes a support platform 19 and a hopper portion 21. The hopper portion is arranged to support the upper ends of two bags 22 and 23, as described in greater detail below, and positions the bags so that their lower ends are supported on the support platform 19. The side of the hopper portion 21 is provided with an opening 24 which receives an elbow 26 providing the discharge or outlet opening 27 of the auger tube, and through which the grass clippings and other debris are discharged into one or the other of the bags 22 and 23.

Enclosed within the auger tube is a powered auger 28 illustrated in FIGS. 4 and 5. The auger is powered by the tractor engine through a V-belt drive 29. The lower or inlet end of the auger tube is pivotally mounted at 31 on the mower deck 12 to allow for upward and downward adjustment of the mower deck. A saddle support 32 engages the underside of the auger tube relatively close to the discharge end thereof and cooperates with the pivot mount 31 to support the tube while allowing for substantial vertical adjustment of the mower deck. Further, the opening 24 in the hopper portion is sized to allow for such adjustment of the position of the mower deck and, in turn, the position of the elbow 26 at the outlet or exit end of the auger tube 17.

The auger tube 17 has a cross section, best illustrated in FIG. 5, which includes a semicylindrical, lower portion 33 and a generally rectangular upper portion 34. The rectangular upper portion is provided in part by a cover 36 connected to the remainder of the auger tube by a hinge 37 and movable between a closed position illustrated in full line in FIG. 5 and an open position illustrated in phantom therein. When operating, the cover 34 is latched closed but can be opened to provide access to the interior of the auger tube and the auger 28 itself.

The auger 28 provides a helical flight 38 extending from the inlet end 16 to adjacent to the outlet end 27. Preferably, the helix is provided with a uniform pitch or lead to a location at about 39. Beyond the location 39, the flight is provided with a gradually decreasing helix angle decreasing to a zero lead or helix angle at the end 41 of the flight. Also, as best illustrated in FIG. 5, the radius of the flight is gradually decreased during the last revolution to a relatively small radius at the end 41. Further, the last portion of the flight 38 extends beyond the end 42 of the central shaft 43 of the auger. It has been found that providing the last portion of the flight with this structure, a more compact column of clippings and other debris is formed. Further, the auger is provided with a spike 44 which extends beyond the end 41 of the flight 38. This spike extends into the column of clippings a short distance and provides additional stability to the exit end of the auger 28.

The semicylindrical lower portion 33 of the auger tube is sized to provide an inner wall which has substantially the same radius as the flight 38 so that the auger closely fits such lower portion 32 and is supported thereby. However, the rectangular upper portion is provided with an upper wall 46 spaced above the upper extremity of the flight 38 to provide clearance with respect to the auger. By providing the upper portion of the auger tube with a noncircular shape, improved efficiency is achieved. The engagement between the inner planar surfaces and the corners therebetween and the clippings resists rotation of the clippings with the auger and improves the efficiency of the auger in moving the clippings along the tube. Further, the clearance provided above the auger provides space along which larger objects, such as stones and sticks, can be carried without jamming the auger.

The semicylindrical lower portion of the tube is formed with perforations or openings 47 extending from a location at about 48 spaced from the inlet 16 to a location at about 49 spaced from the exit end of the tube. Air carried into the auger tube by the blades 13 exhausts through these openings so that the column of clippings reaching the outlet opening 27 is substantially free of entrained air and is very dense. The openings 47 are preferably about $\frac{3}{8}$ inch in diameter, but are at least one-quarter inch in diameter. Further, the number of openings along the side of the semicylindrical lower portion 33 adjacent to the tractor is greater than the number of openings on the side thereof away from the tractor so that any dust and dirt passing through the openings tends to be carried under the tractor, where it is less objectionable.

Since the openings are spaced from the inlet 16, stones or other materials cannot be thrown by the cutter blades out through the openings, and therefore the hazard of flying stones is substantially eliminated. Further the openings do not extend beyond the location 49 to reduce the friction resisting the movement of the grass clippings and the like along the tube.

Since the flights have substantially the same radius as the semicylindrical portion 33, the flights tend to keep the openings clean so that the air can exhaust therethrough. However, the grass clippings tend to be positioned between the periphery of the flights and the wall of the tube, and therefore space the auger up slightly from the wall of the tube so that objectionable wear does not occur.

Preferably, the mower deck is provided with a discharge opening having increased height so that a greater overlap can be provided between the inlet opening 16, which is angled up at a substantial angle and the discharge opening 14 of the mower deck. Therefore, it is preferable to provide the mower deck with an upper wall portion 51 which is inclined upwardly from the remaining upper wall 52 of the mower deck 12. This wall portion 51 is sloped up to provide a smooth transition between the height of the remaining portion of the mower deck and the top wall 53 of the opening 14.

Figure 2:
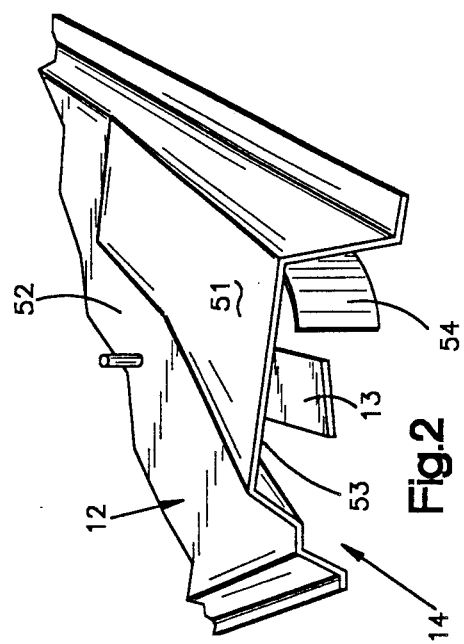
FIG. 2 is an enlarged fragmentary, perspective view of the discharge opening in the mower deck, with the auger tube removed for purposes of illustration.
Figure 3:
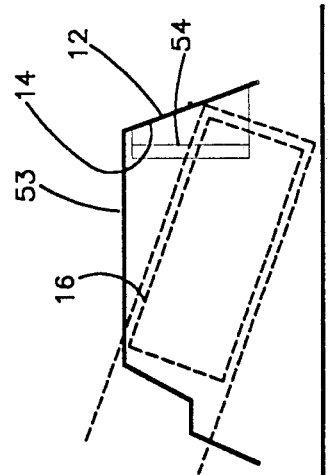
FIG. 3 schematically illustrates the manner in which the auger tube is aligned with the exit end of the mower deck.

Further, it is preferable to provide an inner deflector or baffle 54 which extends along an arc substantially adjacent to the end 56 of the adjacent cutter 13. This deflector tends to direct the clippings into the auger tube in appropriate alignment therewith. This improves the flow of the clippings into the auger tube through the inlet opening 16 and tends to deposit such clippings further up along the auger. Further, the cutter blade 13 is preferably shaped for high lift which cooperates with the baffle and causes the clippings entering the auger tube to tend to move in alignment with the length of the auger tube. As best illustrated in FIG. 3 the increased height of the discharge opening permits greater overlap between such opening and the inlet opening 16.

A bearing 61 mounted on the forward or lower end of the auger tube supports the adjacent end of the central shaft 43 and a belt pulley 62 around which the V-belt drive 29 extends to power the auger. Preferably, the V-belt drive provides a substantial speed reduction. For example, it is typical for the cutter blades to rotate at about 3000 rpm. However, the auger is preferably powered to rotate at about 800 rpm.

Referring now to FIGS. 6, 7, and 7a, the support platform 19 and the hopper portion 21 are mounted on a frame 66 structured to be removably mounted on the rear of the tractor 11. The hopper portion provides two adjacent and similar hoop portions 67 and 68 sized to receive the upper ends of the bags 22 and 23. Positioned around these hoops 67 and 68 are hooks 69 which engage the inner surface of the bags adjacent to their mouths to hold the bags up and open. Preferably, the bags are installed in a manner best illustrated in FIG. 7a over a stud 71. The bag 23 is installed by piercing a portion of the bag adjacent to the mouth over the stud 71 and then pulled the bag in around the hoop 67 over the hooks 69. The opposite end 23a is then pulled tight and is also pierced over the stud 71. This completes the mounting of the bag 23. The bag 22 is mounted in a similar manner by positioning the mouth around the hoop 68 over its hooks 69, and then pulling it tight and piercing the two layers over the stud 71. In the case of plastic bags, the bag material is pressed against the end of the stud until it pierces a hole in the bags to mount the bag. When cloth or permanent bags are to be employed, it is preferable to provide them with grommets for durability and to resist tearing.

The hopper section 21 is provided with a rearward baffle wall 72 which is inclined forward and sized to cause the column of grass clippings and the like 73 being discharged from the elbow 26 (both illustrated in phantom in FIG. 7) to be directed over the open end of the bag 23. The auger operates as a pump which pumps the dense columns 73 out through the elbow above the open ends of the bag. Gravity causes the column to fall down into the bag 23 first causing the bag 23 to be filled. As the tractor is driven over the ground, the shaking action causes further compacting of the material in each of the bags. When one portion of the bag is filled, it creates a resistance which causes the column 73 to buckle and fill other open areas until the bag is completely filled.

Once the bag 23 is filled, it forms a floor for the column 73 to move across the bag 23 to the opening of the bag 22, which then automatically fills in a similar manner. If during the filling of the bag 22 the clippings within the bag 23 settle to some extent, the bag 23 is automatically topped off before continuing to fill the bag 22.

Because the column is air-free and dense, the hopper can be left open so that the operator can monitor the filling of the bag. Further, he can drop stones and sticks which might be collected during the mowing operation into the open ends of the bag.

Once the bags are filled, they are removed from their associated hoops and pulled off the platform 19 which supports the weight of the clippings during the filling operation.

With this invention, a simple, reliable, and efficient bagging attachment is provided which can be used with virtually any type of rotary lawn tractor or the like. Because of the density of the clippings, each bag holds substantially more than normal amounts of clippings and other debris. Further, because the attachment can be used with readily available plastic bags and since the bags are more efficiently filled, the cost of disposing of the clippings and other debris is minimized. When the mower is to be used without the bag, it is a simple matter to disconnect the support system and the pivot mount 31, returning the mower to conventional use.

Although the preferred embodiment of this invention has been shown and described, it should be understood that various modifications and rearrangements of the parts may be resorted to without departing from the scope of the invention as disclosed and claimed herein.

What is claimed is:

1. In a mower having a rotary cutter element within a mowing housing, said cutter being adapted to remove material from the ground and expel such material through a discharge opening in said housing, the improvement comprising an auger tube having an inlet opening communicating with said discharge opening and an outlet end, container means associated with said outlet end to receive material moving therefrom, and an elongated powered auger extending along said auger tube from said inlet opening towards said outlet end, said auger operating to compress and move said material from said inlet opening and to discharge it through said outlet end, said auger tube providing a lower semi-cylindrical wall closely fitting a lower side of said auger and an upper wall portion spaced from an upper side of said auger having a noncircular shape, said material moving along said auger tube engaging said upper wall portion resisting rotation of said material with said auger and promoting movement of said material by said auger along said housing, a space between said auger and said upper wall portion accommodating movement of objects along said housing.

2. In a mower as set forth in claim 1, wherein said upper wall portion provides a cover hinged to said tube for movement between a closed position and an open position providing access to said auger.

3. In a mower as set forth in claim 2, wherein said upper wall portion provides planar walls intersecting at corners.

4. In a mower as set forth in claim 3, wherein said upper wall portion is generally rectangular.

5. In a mower as set forth in claim 4, wherein said semi-cylindrical wall provides a plurality of exhaust openings spaced from both said inlet opening and said outlet opening.

6. In a mower as set forth in claim 5, wherein the majority of said exhaust openings are provided along the side of said semi-cylindrical wall adjacent said mower.

7. In a mower as set forth in claim 1, wherein said auger tube is mounted on said mower by a pivot connected to said mower adjacent said inlet opening and is supported by said mower at a location spaced from said inlet opening, and wherein said mounting permits raising and lowering of said mower housing.

8. A mower attachment for mowers having a rotary cutter element rotatable within a mower housing and adapted to expel material through a discharge opening in said housing comprising an auger tube having an inlet opening adjacent said discharge opening and an outlet spaced from said inlet opening, an auger in said auger tube having a helical flight with a substantially uniform helix angle along the majority of its length and a decreasing helix angle at a discharge end thereof near said outlet end.

9. A mower attachment as set forth in claim 8, wherein said flight has a decreasing radius at said discharge end.

10. A mower attachment as set forth in claim 9, wherein said auger provides a spike extending beyond said flight at the discharge end operable to stabilize said discharge end.

11. A mower attachment as set forth in claim 10, wherein said auger tube provides an elbow at said outlet end directing a column of said material into container means.

12. A mower comprising a mower deck having a discharge opening, rotary cutters in said mower deck mounted for rotation about a vertical axis and operable to eject material through said discharge opening, container means on said mower, and a powered auger operating to receive material through said discharge opening and to pump said material into said container means as a dense column, said container means providing a hoop, a bag having a mouth removably mounted around said hoop, support means supporting a lower end of said bag, said auger means operating to pump said material through said hoop into said bag, said hoop being open along an upper side thereof to permit a mower operator to observe the filling of said bag and to insert objects thereinto.

13. A mower as set forth in claim 12, wherein said container means includes two hoops each having a bag removably mounted thereon, said auger operating to first pump a column of material into one of said bags and after filling said one bag operating to fill the other of said bags.

14. A mower as set forth in claim 13, wherein said one bag is adjacent to an outlet opening in said auger means, and material filling said one bag functions to support said column of material moving to the other of said bags.

15. A mower system comprising a mower deck, blades operable to eject material through a discharge opening, auger means having an inlet adjacent said discharge opening and an outlet, said auger means operating to pump said material from said inlet opening and to discharge said material from said outlet as a dense column, container means including a first container adjacent said outlet and a second container on the side of said first container remote from said outlet, said column filling said first container, and material said first container forming a floor directing said column to said second container whereby both of said containers are filled with dense material.

16. A mower system as set forth in claim 15, wherein said containers are open on the upper ends thereof allowing a mower operator to observe the filling thereof and insert objects into said containers.

17. A mower set forth in claim 16, wherein said system includes a platform and hoops above said platform, said containers being flexible bags supported on said platform and having open ends mounted on said hoops.

18. A mower as set forth in claim 17 wherein a hoop is provided for each bag, and stud means are provided to secure said bags around the associated of said hoops.

19. A mower system comprising a mower deck having a discharge opening, rotary cutter means operable to mow and discharge mowed material through said discharge opening, an elongated powered auger means having an inlet aligned with said discharge opening and being inclined upwardly therefrom to an outlet, said auger means operating to receive material carried by a flow of air from said cutter means and to pump said material from said outlet as a dense column after exhausting said air from said material, said mower deck providing an upper wall inclined up from the remaining upper wall thereof to increase the height of said discharge opening.

20. A mower system as set forth in claim 19, wherein said cutter means is a rotary cutter, and said mower deck provides a curved baffle wall substantially adjacent to said rotary cutter directing said material into said auger means in approximate alignment with the length thereof.

* * * * *